Patented Feb. 8, 1944

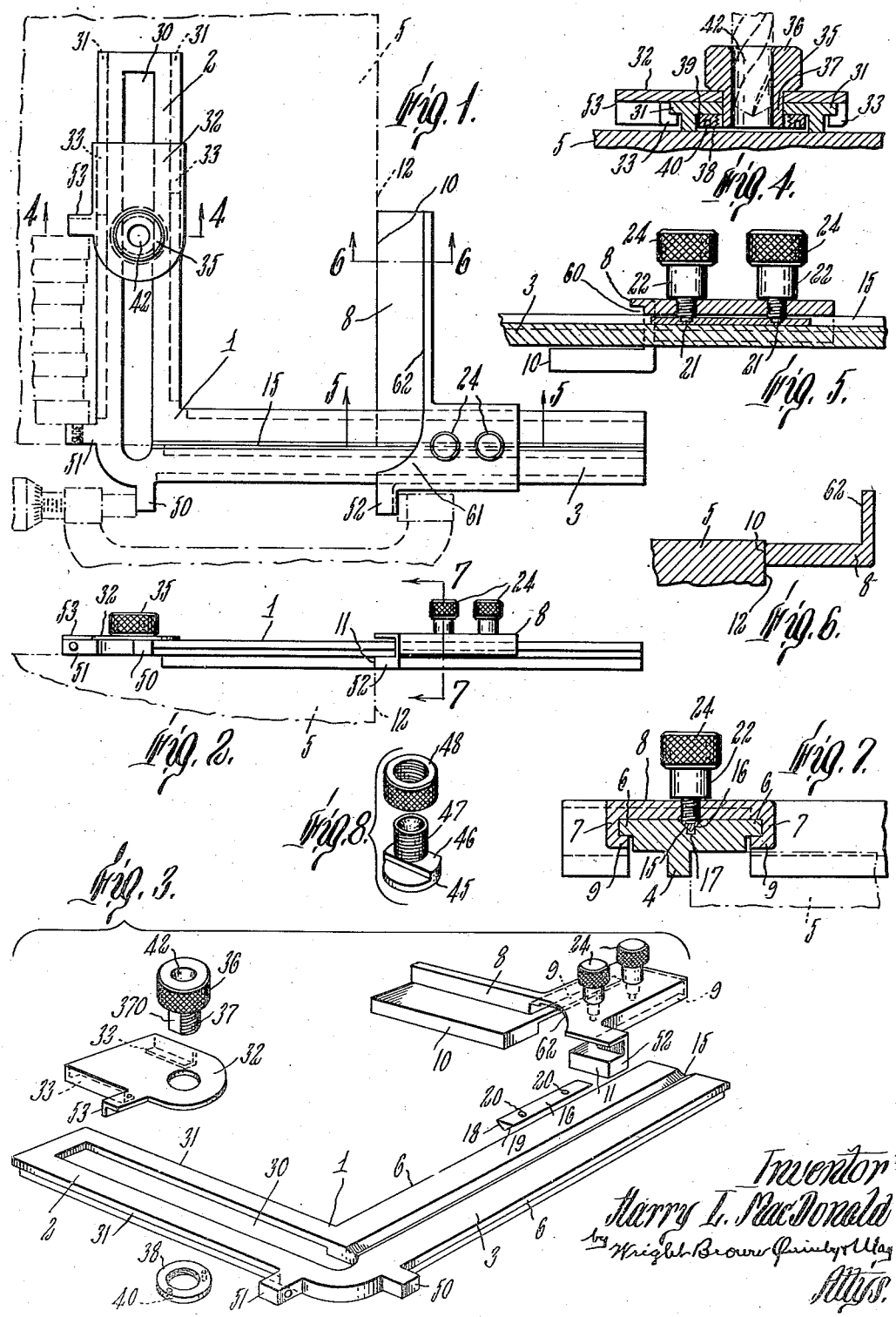

2,341,107

UNITED STATES PATENT OFFICE 2,341,107

PRECISION LOCATING TOOL

Harry L. MacDonald, East Boston, Mass.

Application June 4, 1942, Serial No. 445,725

7 Claims. (Cl. 77—62)

This invention has for an object to provide a tool by which holes may be accurately located in work with relation to two relatively perpendicular planes of the work.

A further object is to provide a tool for this purpose whereby, if desired, the hole may be located at either extreme edge of the work.

Another object is to provide a tool wherein the desired measurements for the location of the hole may be effected accurately and easily.

Still another object is to provide a tool in which the dimensions may be located either with a micrometer or with one or more precision spacing blocks.

A further object is to provide a tool having the foregoing advantages and which is sufficiently light and compact to permit it to be a part of a workman's tool kit, to be carried about with him and to be available always when needed.

For a complete understanding of this invention, reference may be had to the accompanying drawing in which Figure 1 is a top plan view of a tool embodying the invention, in position of use, and showing in broken lines the use of a micrometer for defining one dimenison and measuring blocks for defining another dimension, both dimensions determining the location for a hole to be made in the work.

Figure 2 is a front elevation of the tool in the position of Figure 1.

Figure 3 is an exploded perspective view of the several parts of the tool.

Figures 4, 5 and 6 are detail sectional views on the correspondingly numbered section lines of Figure 1.

Figure 7 is a detail sectional view on line 7—7 of Figure 2.

Figure 8 is a perspective view of a drill bushing of a modified construction.

Referring to the drawing, the locating tool comprises a square 1 having rectangularly arranged arms 2 and 3. The arm 3 is provided with a downwardly extending rib 4 lengthwise thereof which may be brought up against one edge of the work indicated at 5 in broken lines in Figures 1, 2 and 7. This arm 3 is also provided with lateral extensions 6 along its upper face which form guiding means for opposite sides of a slide 8, having downwardly extending side portions 7 in-turned at 9 beneath the portions 6. This slide is provided with a pair of longitudinally spaced portions 10 and 11 which extend below the level of the bottom face of the arm 3 which rests on the work, these portions 10 and 11 together presenting a gaging surface accurately at right angles with that of the rib 4 of the arm 3 and which may be brought up against a side face 12 of the work accurately at right angles to that face of the work contacted by the rib 4. With the slide 8 accurately adjusted with relation to the arm 3, the arm 2 is accurately positioned a desired distance from the edge 12 of the work and accurately parallel thereto.

In order to hold the slide 8 in adjusted position accurately, the top face of the arm 3 is shown as provided with a V groove 15 within which may engage a V clamping block 16. At the center of the V groove 15 is a slot 17 arranged to receive the apex between the sides 18 and 19 of the block 16, so that the bearing of the block 16 against the arm 3 is along the inclined faces of the block and V groove. The upper face of the block 16 is provided with a pair of recesses 20 within which may extend the lower reduced diameter extremities 21 of a pair of clamping screws 22. These clamping screws are threaded through the upper portion of the slide 8 and are provided with knurled heads 24 by which they may be turned, thereby to force the clamping block 16 against the sides of the V groove or to release the block therefrom, thus to lock or release the slide 8.

The arm 2 of the square, which may rest entirely on the top surface of the work, is provided with a longitudinally extending vertical slot 30 and is also provided with lateral top extensions 31 which form guide fins for a drill bushing slide 32. This drill bushing slide is provided with downwardly and inwardly turned side wall portions 33 which engage about the portions 31 of the arm 2 so that the slide 32 is accurately guided for motion longitudinally of the arm 2 and accurately parallel to the edge 12 of the work against which the slide 10 is engaged.

The slide 32 carries a two-part drill bushing 35, one of these parts comprising a head 36 and a shank portion 37, the shank portion 37 extending through the slot 30 and the head portion 36 engaging the upper face of the slide 32. This shank 37, as shown best in Figure 3, may be provided with one or more slabbed off side portions 370 which engage between the sides of the slot 30 to prevent rotation of this portion of the bushing, while the lower end of the shank portion which extends beneath the slot may have threaded thereon the other bushing part comprising a clamping nut 38 which may ride within a relatively wide slot 39 in the under side of the arm 2.

This nut 38 may be in the form of an internally threaded ring with holes 40 opening into its lower face for the reception of a spanner wrench or other tool by which this nut may be turned.

A plurality of bushings may be provided, one for each size of drill which is to be used in drilling holes in the work, the drill being accurately guided by the walls of the central bore 42 of the bushing to the work.

In the arrangement just described it will be noted that the nut 38 is accessible only from beneath the arm 2 so that adjustment of the slide 32 to correctly locate the axis of the bushing with relation to the edge of the work engaged by the rib 4 must be done before the tool is applied to the work. Where this is not desired, a bushing such as shown in Figure 8 may be employed in which the head 45 is positioned beneath the arm 2 and is provided with a flat sided upper portion 46 of a width to ride within the slot 30, while the externally threaded shank 47 extends up through the slot and through a hole in the top face of the slide 32 and receives on its upper end a knurled nut 48, by the turning of which the bushing and the slide 32 may be locked in position or released for adjustment.

In order to facilitate accurate location of the axis of the bushing with reference to the rectangularly related side faces of the work, means may be provided for facilitating the application of measuring devices. For example, as shown, the square I is provided with a pair of projections 50 and 51 having gaging faces, preferably at opposite sides, accurately related to the slides, and the slides themselves may be provided with similar projections 52 and 53. Thus as shown in dotted lines in Figure 1, a micrometer may be engaged with the remote faces of the elements 50 and 52, thus to determine a correct spacing of the axis of the slot 30 from the edge 12 of the work. The face of the element 50 engaged by this micrometer may be accurately in the axis of the slot 30, while the thickness of the element 52 may be accurately known so that the distance of the axis of the slot 30 from the edge of the work plus the thickness of the element 52 will give the correct setting for the micrometer so that the axis of the slot 30 will be in the desired position. Similarly the micrometer may be applied to the remote faces of the elements 51 and 53, this face of the element 51 being accurately located in alinement with the work-engaging rib 4 of the arm 3, while the remote face of the element 53 is a predetermined distance beyond the axis of the hole-locating bushing. If desired, however, the dimensions may be accurately determined by the use of one or more gage blocks which may be positioned between the locating elements, as shown in dotted lines between the elements 51 and 53. In this case the inner face of the element 53 may be located in exact alinement with the axis of the bushing while the inner face of the element 51 may be located a definite known distance inwardly from the gaging edge of the rib 4. In this case the over all dimension of the gage blocks plus the thickness of the element 51 is the distance of the bushing axis from the work edge engaged by the rib 4.

It is also desirable that the tool have a range which will permit the hole to be located close to either of the work edges. For this purpose the slot 30 is shown as extended beyond the gaging edge of the rib 4 so that the axis of the bushing may be adjusted at least as far as the corresponding edge of the work. In order that the bushing may be adjusted with its axis coinciding with the edge 12 of the work, the slide 8 and the arm 2 and the slide 32 may be arranged for overlapping engagement. For example, as shown, the arm 8 is cut back from the gaging faces 10 and 11 which engage the work 12 by forming the slot 60, this slot being of sufficient depth to permit the axis of the slot 30 to be brought into alinement with the edge 12 of the work and the slot being of sufficient width so that the upper wall 61 of the slide 8 may engage over the slide 32 as well as the arm 2. The top portion 61 may be cut away as at 62 to clear the head of the bushing so that the axis of the bushing may be brought to the extreme edge 12 of the work.

As a further refinement, and to provide for wear of the measuring elements 51, 52 and 53, these elements may be provided with screws threaded therethrough which may be turned as desired so that their ends may form the surfaces from which the measuring is effected. As wear takes place these screws may be adjusted so that the tool may be maintained in high accuracy of adjustment.

The tool itself may be made relatively light and small so that it may be carried in the workman's kit.

In operation, after the position of the hole has been correctly located, the entire tool may be clamped against the face of the work by any suitable means such as the well known C clamps, whereupon the tool is sufficiently rigidly supported so that the work may be drilled, the drill being guided through the bushing without danger of relative motion between the tool and the work.

From the foregoing description of certain embodiments of this invention, it should be evident to those skilled in the art that various changes and modifications might be made without departing from the spirit or scope of the invention.

I claim:

1. A locating tool comprising a square provided with a pair of rectangularly related arms, one of said arms having an axially arranged slot therethrough and the other having a longitudinally arranged rib on its lower face for engaging with an edge face of a work piece on which said tool is supported, a slide carried by said other arm and having a downwardly projecting face portion for engagement with an edge face of the work disposed at right angles to said first mentioned edge face, means for securing said slide to said other arm in adjusted position, a slide mounted for lengthwise adjustment along said one arm and having a drill guide bushing riding in said slot, and means for fixing said bushing-carrying slide in adjusted position.

2. A locating tool comprising a square provided with a pair of rectangularly related arms, one of said arms having an axially arranged slot therethrough and the other having a longitudinally arranged rib on its lower face for engaging with an edge face of a work piece on which said tool is supported, a slide carried by said other arm and having a downwardly projecting face portion for engagement with an edge face of the work disposed at right angles to said first mentioned edge face, means for securing said slide to said other arm in adjusted position, a slide mounted for lengthwise adjustment along said one arm and having a drill guide bushing riding in said slot, and means for fixing said bushing-carrying slide in adjusted position, said square and slides having projecting parts presenting surfaces in accurate predetermined relationship to the work-engaging elements and said bushing axis for engagement by measuring devices.

3. A locating tool comprising a square provided with a pair of rectangularly related arms, one of said arms having an axially arranged slot therethrough and the other having a longitudinally arranged rib on its lower face for engaging with an edge face of a work piece on which said tool is supported, a slide carried by said other arm and having a downwardly projecting face portion for engagement with an edge face of the work disposed at right angles to said first mentioned edge face, means for securing said slide to said other arm in adjusted position, a slide mounted for lengthwise adjustment along said one arm and having a drill guide bushing riding in said slot, and means for fixing said bushing-carrying slide in adjusted position, said slot extending beyond the work-engaging rib of said other arm and said sildes being suitably constructed for lapping relation to an extent to permit said bushing to be adjusted with its axis substantially at either of said work edge faces.

4. A locating tool comprising a square provided with a pair of rectangularly related arms, one of said arms having an axially arranged slot therethrough and the other having a longitudinally arranged rib on its lower face for engaging with an edge face of a work piece on which said tool is supported, a slide carried by said other arm and having a downwardly projecting face portion for engagement with an edge face of the work disposed at right angles to said first mentioned edge face, means for securing said slide to said other arm in adjusted position, a slide mounted for lengthwise adjustment along said one arm and having a drill guide bushing riding in said slot, and means for fixing said bushing-carrying slide in adjusted position, said slot extending beyond the work-engaging rib of said other arm and said work-engaging slide being recessed to overlap said bushing-carrying slide and to partly enclose said bushing to an extent to permit said bushing to be adjusted with its axis substantially at either of said work edge faces.

5. In a locating tool, a work-engaging member having a longitudinally slotted arm, a slide guided for motion along said arm, a tubular pilot for a drill carried by said slide, said pilot having a head and an externally threaded portion extending from said head and through said slot, and a nut threaded on said portion for clamping said pilot slide and work-engaging member in adjusted position.

6. In a locating tool, a work-engaging member having a longitudinally slotted arm, a slide guided for motion along said arm, a tubular pilot for a drill carried by said slide, said pilot having a head and an externally threaded portion extending from said head and through said slot, and said pilot including a nut threaded on said portion for clamping said pilot slide and work-engaging member in adjusted position, one of said pilot portions having a flat face for engagement with a side wall of said slot to prevent turning of one of said threaded pilot portions when the other threaded pilot portion is being turned.

7. A locating tool comprising a work-engaging member, a slide carried by said member, and means for clamping said slide to said member comprising an element threaded through said slide, said member having a longitudinally extending V groove and slotted at the apex of said groove, a clamp block having angularly disposed side faces engageable with the sides of said V groove, the apex between said side faces extending into said slot out of contact with said member, said block having a recess receiving an end portion of said threaded element.

HARRY L. MacDONALD.